United States Patent
Zhou et al.

(10) Patent No.: US 9,471,303 B2
(45) Date of Patent: Oct. 18, 2016

(54) FAçADE FRAMEWORK FOR IDE

(71) Applicants: Yiquan Zhou, Singapore (SG); Ludo Franciscus Maria Noens, Singapore (SG); Qiushi Wang, Singapore (SG)

(72) Inventors: Yiquan Zhou, Singapore (SG); Ludo Franciscus Maria Noens, Singapore (SG); Qiushi Wang, Singapore (SG)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 14/613,381

(22) Filed: Feb. 4, 2015

(65) Prior Publication Data
US 2016/0224336 A1    Aug. 4, 2016

(51) Int. Cl.
*G06F 9/44*    (2006.01)
*G06F 9/445*    (2006.01)

(52) U.S. Cl.
CPC ............. *G06F 8/71* (2013.01); *G06F 9/44521* (2013.01)

(58) Field of Classification Search
CPC ........................................................ G06F 8/20
USPC ........................................................ 717/101
See application file for complete search history.

(56) References Cited

U.S. PATENT DOCUMENTS

2006/0277231 A1* 12/2006 Kral .......................... G06F 8/70
                                                           708/102
2013/0047137 A1*  2/2013 Bak .......................... G06F 8/71
                                                           717/121

* cited by examiner

*Primary Examiner* — Hang Pan
(74) *Attorney, Agent, or Firm* — Horizon IP Pte. Ltd.

(57) ABSTRACT

A framework for developing web and hybrid applications (Apps) of a project is described herein. In accordance with one aspect, a façade framework is provided. The façade framework includes a web library having a set of application program interfaces (APIs) of hybrid features of a mobile device, a hybrid library having a set of APIs of hybrid features of a mobile device, and a unified interface for interfacing with the web and hybrid libraries. Base code of a base project may be provided using an application development system. The base code may include common code to web assets common to the web and hybrid Apps of the project. The base code may be extended using the application development system to produce an extended code of the project, where the extended code includes hybrid features used by the project. The unified interface provides APIs from the web and hybrid libraries used by the project. The façade framework enables the extended code to serve as a unified code solution to both web and hybrid App of the project.

20 Claims, 11 Drawing Sheets

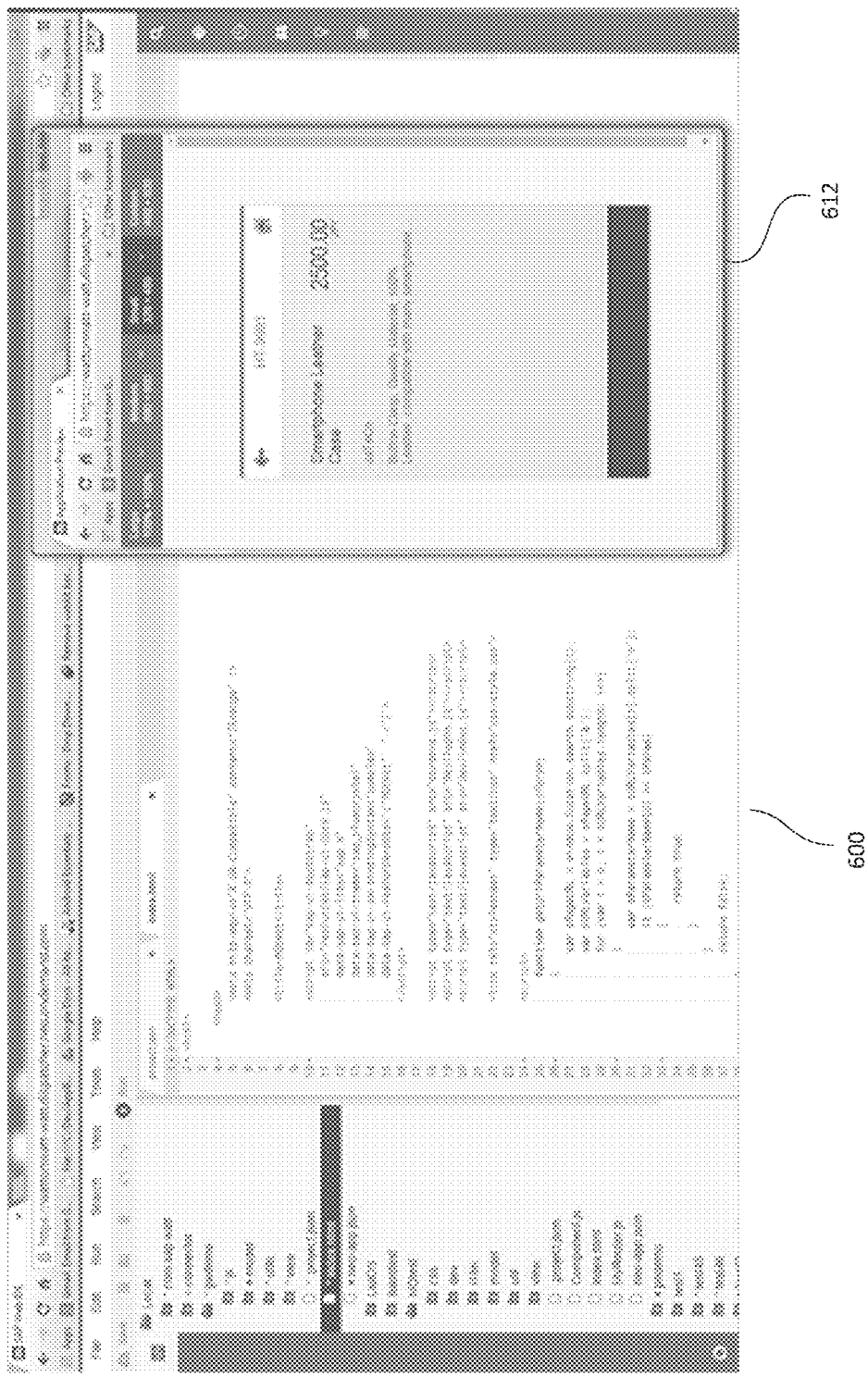

FAçADE FRAMEWORK FOR IDE

TECHNICAL FIELD

The present disclosure relates generally to a framework for developing applications (Apps).

BACKGROUND

Apps are developed for a wide variety of purposes. One type of App is web-based App (web App). A web App, for example, includes web application code that resides on a server. The web App is accessed using a browser on an end-user device. An advantage of web Apps is that they can be maintained and updated without distributing and installing software on local devices as well as inherent support for cross-platform compatibility. To develop a web App, a web integrated development environment (IDE) may be employed.

Conventional web Apps generally cannot access local resources, unlike a native App. For example, the web browser prevents access by the web App to native APIs. In other words, web Apps are not mobile enabled. Access to native APIs may be provided through hybrid Apps. Hybrid Apps are based on a mixture of native application code and web application code. However, there are still differences in implementations of web assets.

In the case where an App project requires both a hybrid and a web App, developers need an additional development process to ensure that the web assets are compatible and sound as either a web or a hybrid App. This requires longer development time for projects requiring both web and hybrid versions of the App. Furthermore, two code bases need to be maintained, one for the web version and the other for the hybrid version of the App. Maintaining two code bases is prone to errors as well as inefficient use of resources.

The present disclosure relates to a façade framework used to effectively and efficiently generate a unified application code (one code base) for both hybrid and web versions of an App.

SUMMARY

A framework for developing web and hybrid applications (Apps) of a project is described herein. In accordance with one aspect, a façade framework is provided. The façade framework includes a web library having a set of web application program interfaces (APIs) of hybrid features of a mobile device, a hybrid library having a set of hybrid APIs of hybrid features of a mobile device, and a unified interface for interfacing with the web and hybrid libraries. Base code of a base project may be provided using an application development system. The base code may include common code to web assets common to the web and hybrid Apps of the project. The base code may be extended using the application development system to produce an extended code of the project, where the extended code includes hybrid features used by the project. The unified interface provides APIs from the web and hybrid libraries used by the project. The façade framework enables the extended code to serve as a unified code solution to both web and hybrid Apps of the project.

With these and other advantages and features that will become hereinafter apparent, further information may be obtained by reference to the following detailed description and appended claims, and to the figures attached hereto.

BRIEF DESCRIPTION OF THE DRAWINGS

Some embodiments are illustrated in the accompanying figures. Like reference numerals in the figures designate like parts.

FIGS. 6a-f show exemplary screen shots of a UI of an implementation of an IDE.

DETAILED DESCRIPTION

In the following description, for purposes of explanation, specific numbers, materials and configurations are set forth in order to provide a thorough understanding of the present frameworks and methods and in order to meet statutory written description, enablement, and best-mode requirements. However, it will be apparent to one skilled in the art that the present frameworks and methods may be practiced without the specific exemplary details. In other instances, well-known features are omitted or simplified to clarify the description of the exemplary implementations of present frameworks and methods, and to thereby better explain the present frameworks and methods. Furthermore, for ease of understanding, certain method steps are delineated as separate steps; however, these separately delineated steps should not be construed as necessarily order dependent or being separate in their performance.

Figure 1:
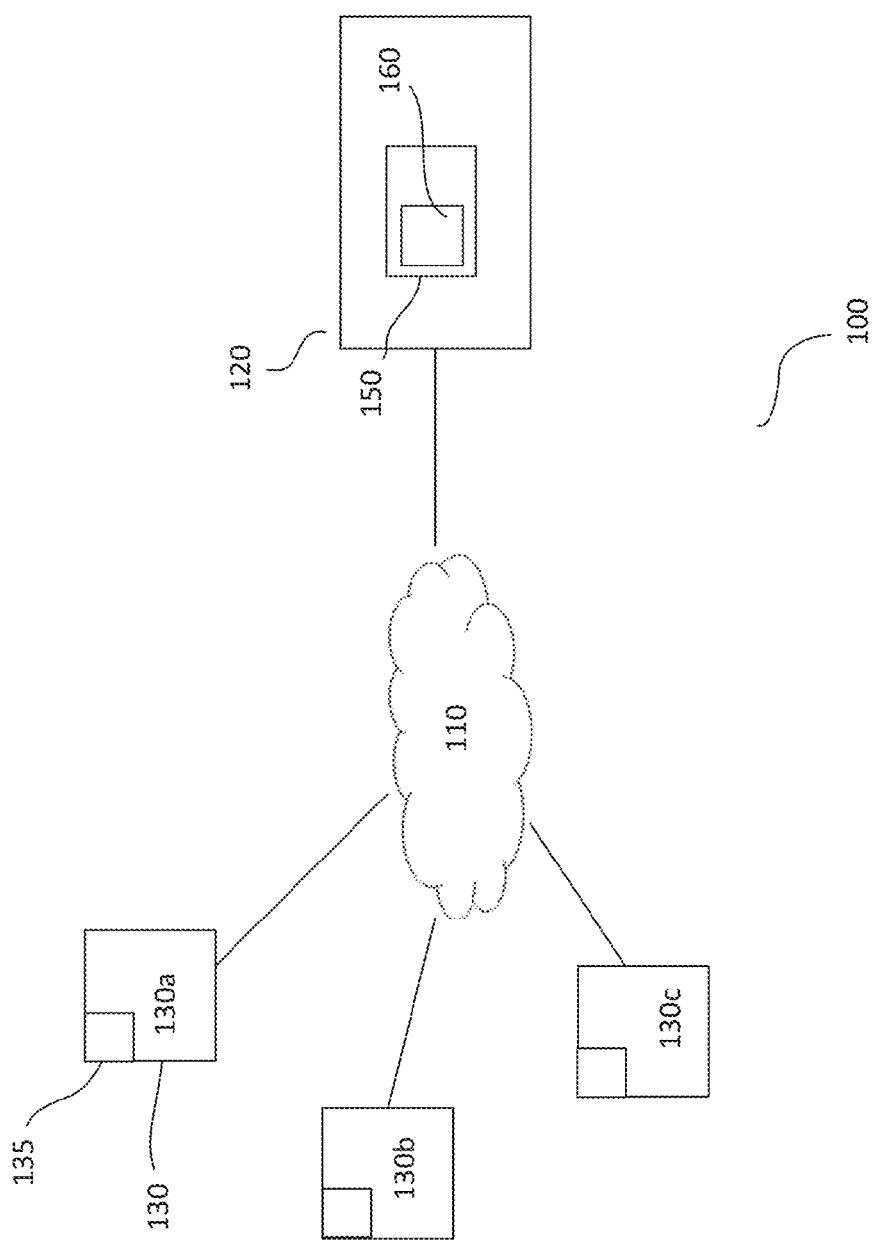
FIG. 1 shows a simplified diagram of an exemplary environment or architecture.

FIG. 1 shows a simplified diagram of an exemplary environment or architecture 100. Environment 100 may have a distributed architecture, such as a client-server architecture. The environment, in one implementation, includes a communication network 110. The communication network, for example, may be the World Wide Web (WWW or Web). Other types of communication networks or combination of networks may also be useful.

The environment includes a server 120. A server may be a computer with a memory and a processor. Various types of computers may be employed for the server. For example, the computer may be a mainframe, a workstation, as well as other types of processing devices. The memory of a computer may include any memory or database module. The memory may be volatile or non-volatile types of non-transitory computer-readable media, such as magnetic media, optical media, random access memory (RAM), read-only memory (ROM), removable media, or any other suitable local or remote memory component.

The server 120, for example, may be a plurality of interconnected servers. For example, the servers are interconnected by a communication network. The communication network may be an internet, an intranet, a local area network (LAN), a wide area network (WAN) or a combination thereof. The servers may be located in a single or multiple locations. The interconnected servers may be collectively referred to as a server.

The server 120 is configured to store and process resources requested by client devices 130. A client device may be a local computing device with, for example, a local memory and a processor. The memory may be volatile or non-volatile types of non-transitory computer-readable media, such as magnetic media, optical media, random access memory (RAM), read-only memory (ROM), removable media, or any other suitable local or remote memory component. Various types of processing devices may serve as the client device. For example, the client device may be a PC, a tablet PC, a workstation, a network computer, or a mobile computing device, such as a laptop, a tab or a smart phone. Other types of processing devices may also be used.

The environment of the client device may be referred to as a local or native environment. A client or end-user and client device may be used interchangeably. For example, when referring to an end-user, it is understood that the end-user connects to the communication network using a client device. The client device may be referred to as the client side while the server may be referred to as the server side. It is understood that client devices need not be of the same type. For example, some client devices may be mobile devices running of different types of platforms, such as iOS or Android, while other devices may be desktop or laptop computers.

In one implementation, the local environment of the client device includes a user agent 135. The user agent, for example, may be a web browser. The browser facilitates communication with the server. For example, the browser initiates communication to a web server by making a request for a specific resource using, for example, a Hypertext Transfer Protocol (HTTP) and the server responds with the content of that resource. Communication with the server, for example, may be through internet connection. The internet connection may be using a mobile telecommunication network, such as a 4G network. Other types of connections to the server may also be useful. An end-user may access the server by, for example, having a user account.

In other implementations, the environment 100 may be a cloud-computing environment. In such cases, the interconnected servers 120 form a cloud. The cloud, for example, hosts and processes resources, such as applications and data, as well as other resources. Different servers may be used to store or process different resources. Such hosting and processing may be considered as cloud services. Various types of cloud services may be provided. The cloud services may be provided in a public, private or hybrid network. The cloud services may be provided by a cloud service provider. For example, the cloud services may be SAP HANA Cloud Platform provided by SAP SE. Other types of clouds and cloud providers may also be useful. A client device 130 accesses resources on the cloud using, for example, a browser 135. Other configurations of the environment may also be useful.

The environment 100 includes an application (App) development system 150. The App development system 150 may be a software tool that is employed in the development of Apps. The development tool, for example, is used to develop web Apps. In one implementation, the development tool is an integrated development environment (IDE). The IDE may be a wizard-based IDE. For example, the IDE includes wizards to guide the developer in developing Apps. In one implementation, the IDE is web-based IDE residing in the server 120. In some implementations, the IDE resides on the cloud. The web IDE is accessed by a web browser 135 on a client device 130. For example, an end-user, such as a developer of Apps, may log on to the cloud, accessing the IDE from the web browser of a client device. The IDE, for example, may be a SAP Web IDE from SAP SE. Other types or configurations of IDEs may also be useful.

In one implementation, the server includes a façade framework 160. The façade framework, for example, may be a thin façade framework. For example, the framework code for a project is lightweight. The framework, from an architecture perspective, serves as a layered interface of an App. The façade framework facilitates in developing both web and hybrid versions of an App using a unified code solution. For example, one code base is used to generate both a web App and a corresponding hybrid version of the web App. With respect to the hybrid version, it includes on-device features not included in the web version. In some implementations, the façade framework facilitates demonstrating and testing of an App. In the case of a hybrid App, the façade framework provides data from the device.

The façade framework may be integrated into the IDE. For example, the façade framework may be integrated as a plug-in function of a web IDE. In other implementations, the façade framework may serve as a moderator. For example, the façade framework may serve as a moderator running in an App. The framework may coordinate various functions, such as bootstrap, logic flow and libraries, depending on the App type. Other configurations of the façade framework and web IDE may also be useful.

As described, the façade framework enables a project requiring both web and hybrid versions to be completed using a unified code solution. This enables developers and managers to simply focus on development and management of one base code through the whole life cycle of the project.

Figure 2:
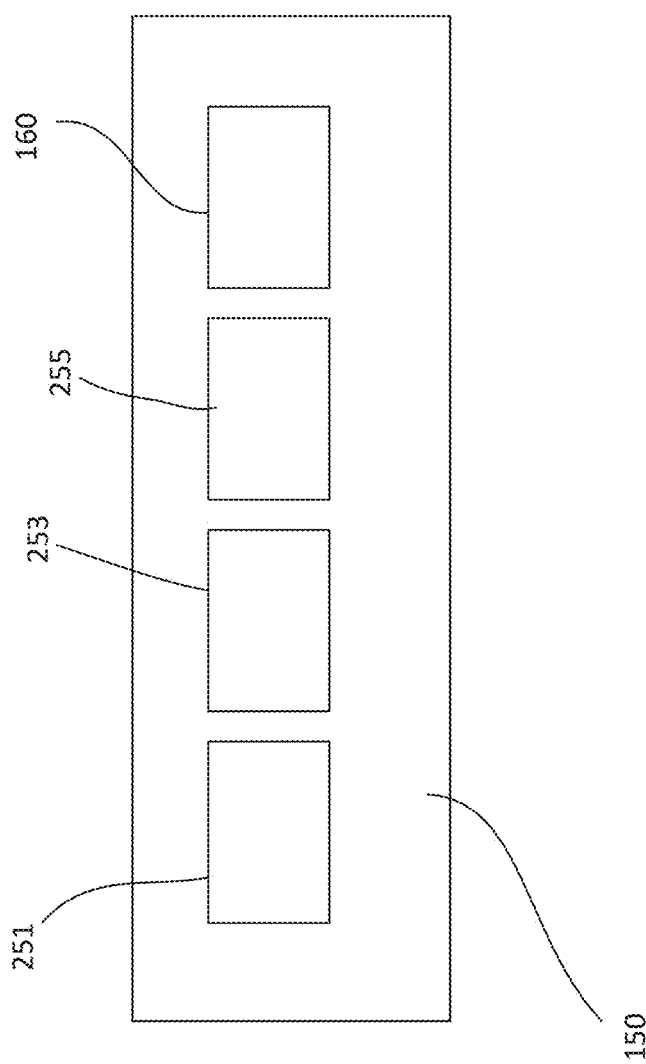
FIG. 2 shows a simplified block diagram of an embodiment of an App development system.

FIG. 2 shows a simplified block diagram of an embodiment of an App development system 150. As shown, the App development system includes various modules for developing a web App. In one implementation, the App development system includes a UI module 251, a resource module 253 and a code module 255. Providing different or additional modules may also be useful.

The UI module 251 may be a graphical UI (GUI) module. The UI module enables a user to navigate the IDE. For example, the UI may include a menu bar with commands or functions that a user can select. The commands and functions facilitate in the process of creating, testing and deploying the App. In one implementation, the UI may be based on SAP UI5. Other types of UIs may also be useful.

The resource module 253 includes resources for creating or developing a web App. For example, the resource module includes various templates for different types of Apps. For example, templates, such as Kapsel App templates, Fiori Templates may be provided in the resource module. Providing templates for other types of Apps may also be useful. The resource module may include other types of resources for developing Apps. Such resources may include design resources, such as layout command resources. For example, mobile controls and mobile UI components, as well as others, may be included in the resource module.

The code module 255 facilitates coding for the App. For example, a user may employ the code module to generate codes for the App. In one implementation, the code modules include a code editor for manual coding as well as autocoding capabilities, such as coders, for completing codes. The generated codes may be modified using the code editor.

In one implementation, the App development system includes a façade framework 160. The façade framework facilitates in developing both web and hybrid Apps from one App code base. For example, the App code base is used to generate both a web App and a corresponding hybrid version of the web App. The façade framework may be a plug-in function of the App development system and serves as a moderator running in an App. The façade framework may be integrated into a development tool chain for App development. Other configurations of the façade framework may also be useful.

Other modules, such as a preview module and a deployment module (not shown) may also be provided. The preview module facilitates previewing an App that has been developed or is under development while the deployment module includes functions to facilitate deployment of the App. The App may be deployed to a mobile platform and mobile device. The mobile platform, for example, may be a mobile server from SAP SE such as, SAP Mobile Platform (SMP) server, which manages the life cycle of mobile applications on the devices. For example, when the deployment command is selected, the deployment module configures the App, simplifies settings, builds the App and deploys it. Deployment functions, for example, may be included in the IDE. Other configurations of the deployment functions may also be useful.

Figure 3:
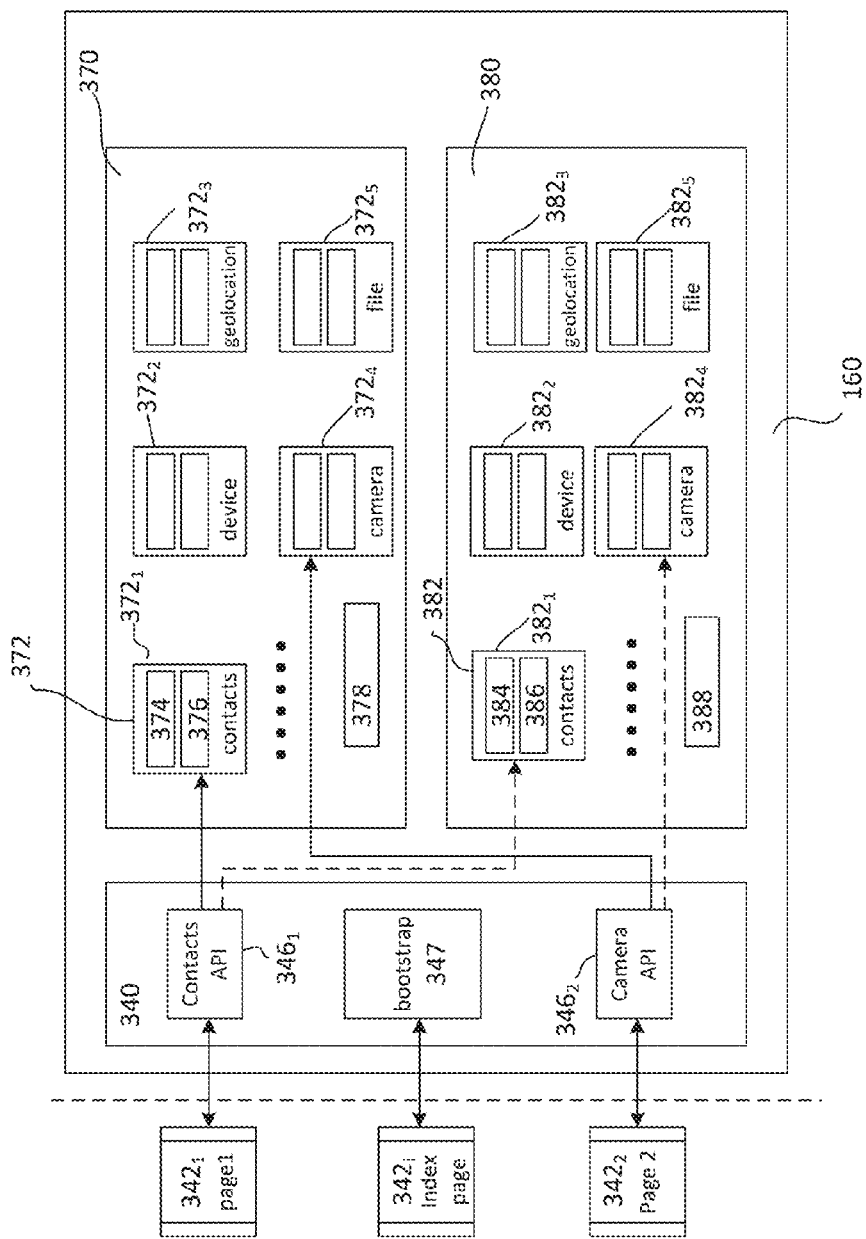
FIG. 3 shows a simplified block diagram of an embodiment of a façade framework.

FIG. 3 shows a simplified block diagram of an embodiment of a façade framework 160. As shown, the façade framework includes various modules for generating hybrid and web versions of a project from one App code base. In one implementation, the façade framework includes a unified interface module 340, a hybrid library module 370 and a web library module 380. Providing different or additional modules may also be useful.

The hybrid library module includes a set of application program interfaces (APIs) 372. The APIs, for example, are abstract APIs. The APIs in the hybrid library used in the project are packaged together with a hybrid version of the project. The various APIs correspond to hybrid features, which may be employed by an App. In one implementation, the hybrid library module includes APIs, which may be used in a project. For example, the hybrid library module includes APIs corresponding to all native features on, for example, a mobile device. The hybrid library may include a contacts API $372_1$, a device API $372_2$, a geolocation API $372_3$, a camera API $372_4$ and a file API $372_5$ as well as other APIs (not specifically shown). Other types of APIs for other services or features of a device may also be included. The hybrid library module includes a hybrid registration unit 378. The hybrid registration unit registers the library path of the APIs called. This is included in the bootstrap code that will be packaged.

The web library module includes a set of application program interfaces (APIs) 382. The APIs, for example, are abstract APIs. The APIs in the web library used in the project are packaged together with a web version of the project. The packaged APIs in the web App are merely pass-through APIs without any real function. The various APIs correspond to hybrid features, which may be employed by an App. In one implementation, the web library module includes APIs, which may be used in a project. For example, the web library module includes APIs corresponding to all native features on, for example, a mobile device. The web library may include a contacts API $382_1$, a device API $382_2$, a geolocation API $382_3$, a camera API $382_4$ and a file API $382_5$ as well as other APIs (not specifically shown). Other types of APIs for other services or features of a device may also be included. The web library module includes a web registration unit 388. The web registration unit registers the library path of the APIs called to facilitate loading of the libraries of the web App during runtime.

A code skeleton is constructed for an API. For example, a code skeleton is constructed for each API. In one implementation, the code skeleton is an asynchronous code skeleton. A code skeleton includes an API call 374 and 384 and an API call back action 376 and 386. The call invokes an API while the call back action enables a developer to define what actions are performed on the returned data. In one implementation, the APIs are unified APIs. For example, codes of APIs for the hybrid and web libraries are the same. Also, the set of APIs for the hybrid library and the set of APIs for the web libraries are consistent. For example, the libraries include the same APIs. Regardless whether the App is a hybrid App or a web App, the same APIs with the same codes are available.

In the case of a hybrid App, the actual feature API calls of native libraries are implemented. These implementations from developers are hosted in a specific directory, as indicated in the hybrid registration unit, and will be packaged together while generating project files finally. On the other hand, for a web App, nothing is implemented for API calls. For example, when an API is called in a web App, there are no actions for callback. By providing two sets of APIs, a web App or a hybrid App may be produced from a single App code base.

As for the unified interface, it includes a bootstrap module 347. The bootstrap module, for example, may be embedded in an index page. The index page $342_i$ may be automatically loaded in the browser when running the App. For example, the index page may be accessed when the App is started. The bootstrap module provides the correct project configuration and loading of libraries according to whether the App is a web or hybrid version of the project. The bootstrap module routes to the bootstrap phase of the code of the App. Depending on whether the selection is for a hybrid or web App, the respective libraries are used. For example, the hybrid library is used for a hybrid App while the web library is used for a web App. For a hybrid App, the actual feature API calls of native libraries are implemented. These implementations from the user are hosted in a specific directory, as indicated in the hybrid registration unit, and will be packaged together while generating the project files. For a web App, the user or developer may implement some adjustment to optimize the UI in the APIs. However, there is no real action for callback response data when the APIs are called.

The unified interface, for example, is an API library. APIs used in an App are used from the appropriate library. In the case of a hybrid App, APIs are used from the hybrid library (indicated by solid arrows); in the case of a web App, APIs are used from the web library (indicated by dashed arrows). The pages enable the user to define return actions of the calls to the API. In the example, the App may use the contacts API $346_1$ and camera API $346_2$. Pages $342_1$ and $342_2$ may contain the implementation of return actions of the calls to the contact and camera APIs.

The façade framework, as described, allows App developers to just focus on application logic development. Wherever developers need to add a hybrid feature API, the hybrid API in the hybrid library and its callback app logic is added in a dedicated file. This results in a unified code base for both web and hybrid versions of the project. After coding is finished, the unified code can smoothly switch to a web App or a hybrid App with the corresponding façade framework library package. For example, a web version of the project is packaged with APIs from the web library while a hybrid version of the project is packaged with APIs from the hybrid library.

The façade framework may be used to facilitate demonstration and testing of a project under development. The unified code may be previewed as a web or hybrid version of the project. For example, after finishing the unified code and prior to packaging, a user may view the project as a web or hybrid App. For example, after hybrid code extension, the unified code can run as either a web or a hybrid App, facilitated by the façade framework.

When previewing or demonstrating the project as a web App, the façade framework provides the APIs from the web library. Demonstrating the web App may be achieved using a web demonstration function included in, for example, the function menu of the IDE.

In the case of demonstrating the project as a hybrid App, the façade framework includes an additional library with mock up or test data that can be hooked up to the unified interface. The mock up data is used to test the hybrid App. For example, the mock up data will be retrieved and returned as callback response. The mock up data is used for demonstration purposes only. For example, the mock up data is not packaged in the build App. The registration of demonstration logic is in the bootstrap library, which will be packaged. To demonstrate the hybrid App, a hybrid demonstration function may be selected in the function menu of the IDE.

Figure 4:
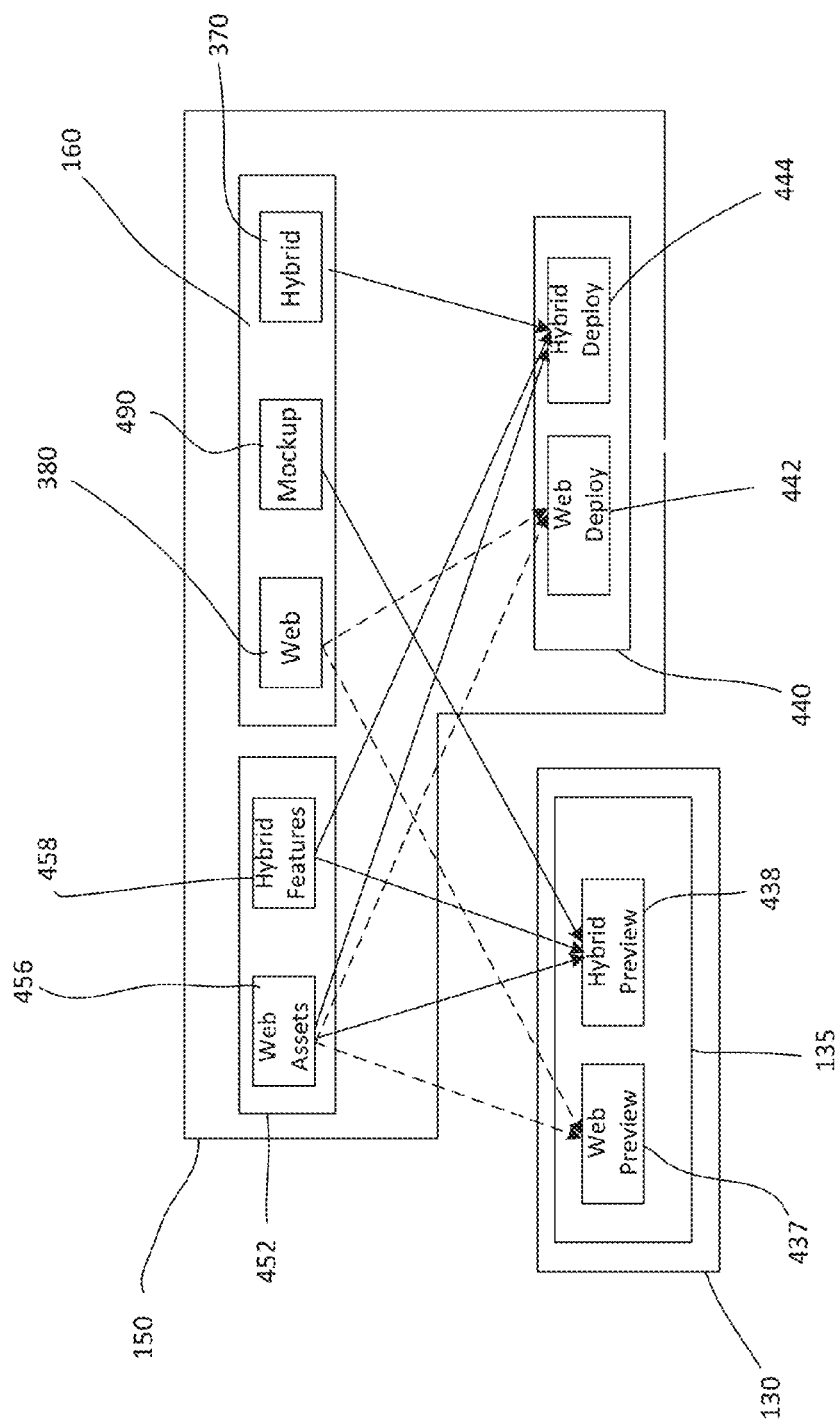
FIG. 4 graphically illustrates an implementation of a process of App development.

FIG. 4 graphically illustrates a high level environment 400 for developing an App. The developer, for example, employs a web-based IDE 150 to develop an App. The IDE may be located on a server of a network. In one implementation, the server is a cloud server located on a cloud. Other types of networks or servers may also be useful. The developer accesses the IDE by, for example, a web browser 135 of an end-user device 130. Other configurations used in developing an App may also be useful.

The IDE includes various modules for facilitating the development of an App. The IDE may be used to develop different projects for different Apps. In one implementation, the IDE facilitates in developing a unified solution for both web and hybrid versions of a project. For example, a unified code is used to produce a web and a hybrid version of a project. To facilitate developing a unified code solution for a project, the environment includes a façade framework 160.

The project, as discussed, includes a unified code base for both web and hybrid versions of the App. The code base for the project includes using resources 452. The resources may include web assets 456 for both web and hybrid versions of the project as well as hybrid features 458 for the hybrid version of the project. For example, web assets are common implementations for web and hybrid versions of the project while hybrid feature codes are specifically for the hybrid version of the project.

The façade framework 160 may be integrated into the IDE. For example, the façade framework may be integrated as a plug-in function of the IDE. In other implementations, the façade framework may serve as a moderator. For example, the façade framework may serve as a moderator running in an App. Other configurations of the façade framework may also be useful.

The façade framework includes a web library module 380 for developing a web App and a hybrid library module 370 for developing a hybrid App. As discussed, the web library includes APIs used with a web version of the project and the hybrid library includes APIs used with a hybrid version of the project. In one implementation, the façade framework includes a demonstration library 490. The demonstration library contains mock up data to interface with the APIs of the hybrid library when demonstrating a hybrid App. Demonstration of an App may be triggered by selecting the demonstration function in the IDE menu. The mock up data is used to simulate the real data from the unified APIs used by the hybrid App.

The façade framework may facilitate in the deployment of an App. For example, the façade framework provides libraries for packaging (building) and deploying web and hybrid versions of the project. For example, the façade framework provides a web library for packaging and deploying a web version of the project and a hybrid library for packaging and deploying a hybrid version of the project.

The user may preview or test the project. For example, the user may preview and test a web version of the project using the web demonstrator 437 via the web browser. The façade framework provides APIs from the web library for previewing or testing. If the web App works accordingly, the user may initiate the web deployment unit of the deployment module 440 for packaging and deploying the web App with the web APIs from the web library.

In the case of previewing and testing a hybrid version of the project, the user may employ the hybrid demonstrator 438 via the web browser. The hybrid demonstrator may be the same as the web demonstrator. Alternatively, hybrid demonstrator in the user device may be a hybrid wrapper app or a companion App. Other configurations of the hybrid demonstrator may also be useful. If the hybrid App works accordingly, the end user may initiate the hybrid deployment unit of the deployment module 440 for packaging and deploying the hybrid App with APIs of the hybrid library.

In one implementation, the deployment module is part of the IDE. Providing other configurations of deployment module may also be useful. As discussed, the deployment module is employed to package an App and deploy it. In the case of deploying a web version of the project, a web deployment unit 442 is initiated to package and deploy the web App. The web App is packaged with the APIs from the web library. The packaged web App is deployed to, for example, a web server. In the case of deploying a hybrid version of the project, a hybrid deployment unit 444 is initiated to package and deploy the hybrid App. The hybrid App is packaged with the APIs from the hybrid library. The hybrid App may be deployed to an App store or a cloud server. Deployment of the hybrid App may also be to a simulator or a development device.

Figure 5:
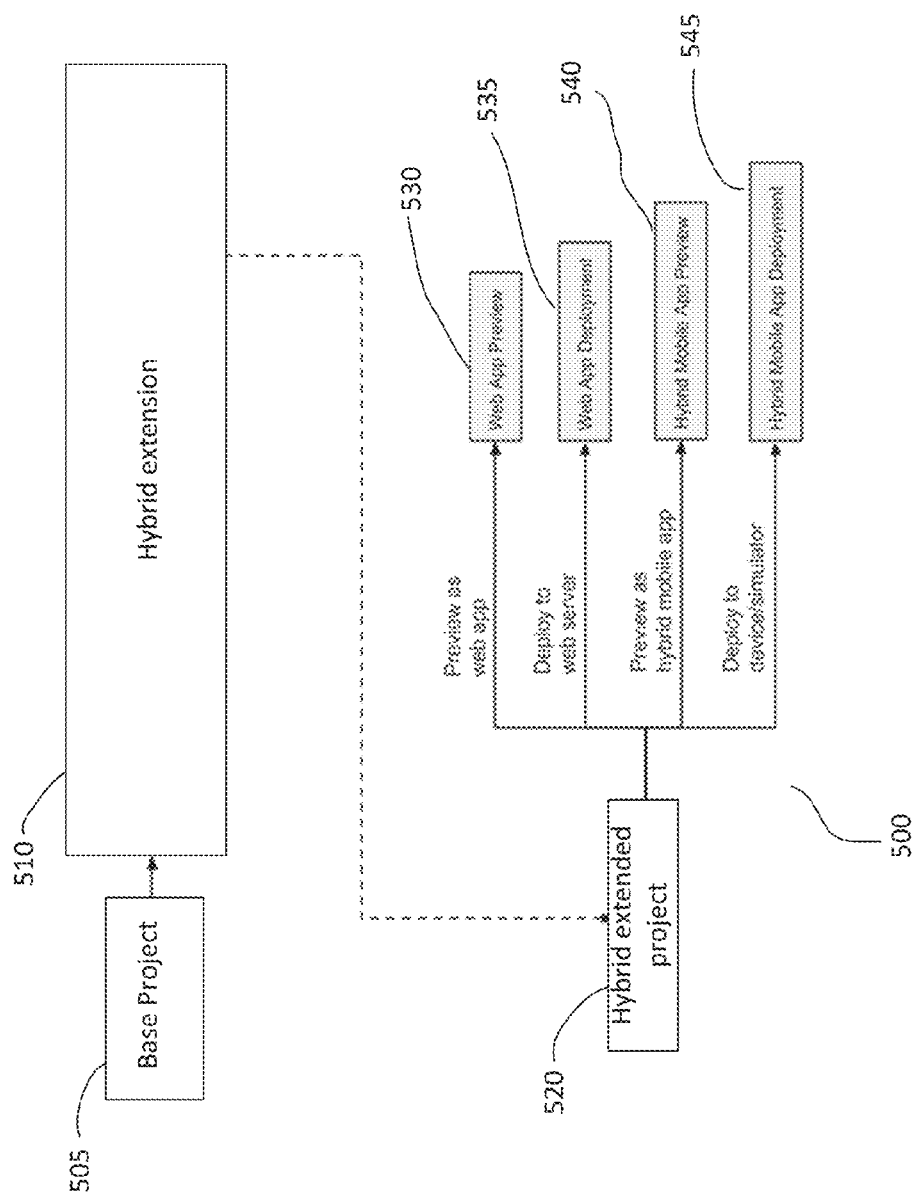
FIG. 5 illustrates an implementation of a process of App development.

FIG. 5 illustrates an embodiment of a process 500 for developing an App. At step 505, code of a base project is provided. The code of the base project includes web assets. For example, the code of the base project includes common code for both hybrid and web versions of a project.

At step 510, the user continues to extend the project code to a hybrid project. For example the hybrid extension produces a unified code for both web and hybrid versions of the project. In one implementation, the hybrid extension is facilitated by a façade framework, which includes at least web and hybrid API libraries. Hybrid extension may include the user providing hybrid feature settings of the project. Based on the settings, the code includes calls to APIs used in the project. The code results in a hybrid extended project at step 520. The hybrid extended project includes a unified code solution for both web and hybrid versions of the project. The unified code solution may run as either a web or hybrid App.

The user may preview the hybrid extended project code (unified code) as a web App at step 530. For example the user may preview and test the unified code using the web demonstrator in the web browser. When previewing the web version of the project, the façade library provides the APIs from the web library. If the user is satisfied with the web version of the project, the user may initiate deployment of the web version of the project at step 535. For example, the web App may be packaged with APIs from the web library and deployed to a web server.

The user may preview the hybrid extended project code as a hybrid App at step 540. For example the user may preview and test the unified code using the hybrid demonstrator. The demonstration utilizes APIs from the hybrid library and mock up data from the demonstration library of the façade framework. If the user is satisfied with the hybrid version of the project, the user may initiate deployment of the hybrid version of the project at step 545. For example, the hybrid App may be packaged with APIs from the hybrid library and deployed to an App store or a cloud server. Deployment of the hybrid App may also be to a simulator or a development device.

FIGS. 6a-f show screen shots of a UI 600 of an IDE for developing unified code base for web and hybrid versions of a project, which is facilitated by a façade framework. The UI for example, is based on SAP UI5. Other types of UIs may also be useful. In one implementation, the UI is part of a SAP Web IDE. Other configurations may also be useful.

Figure 6B:
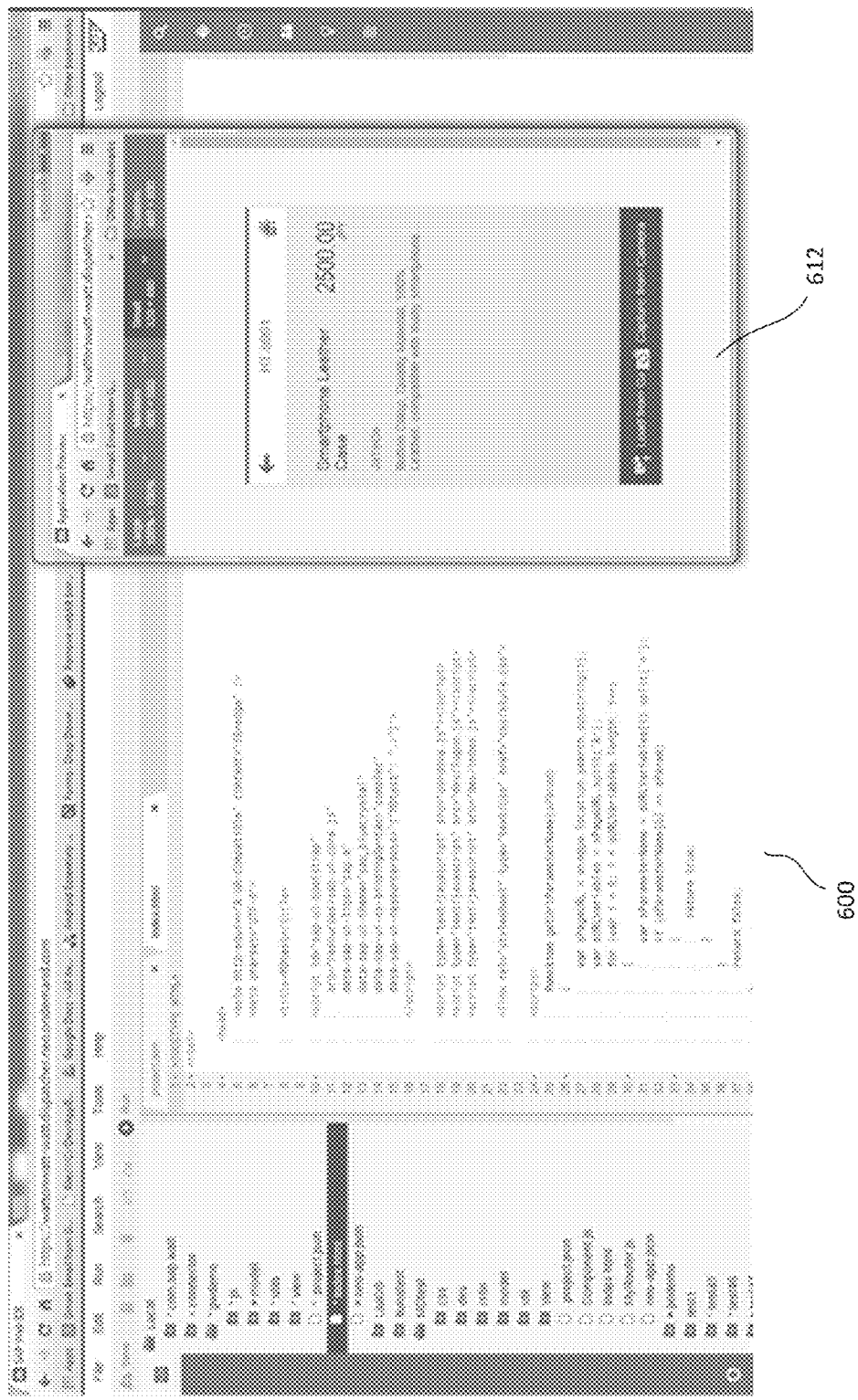
Figure 6C:
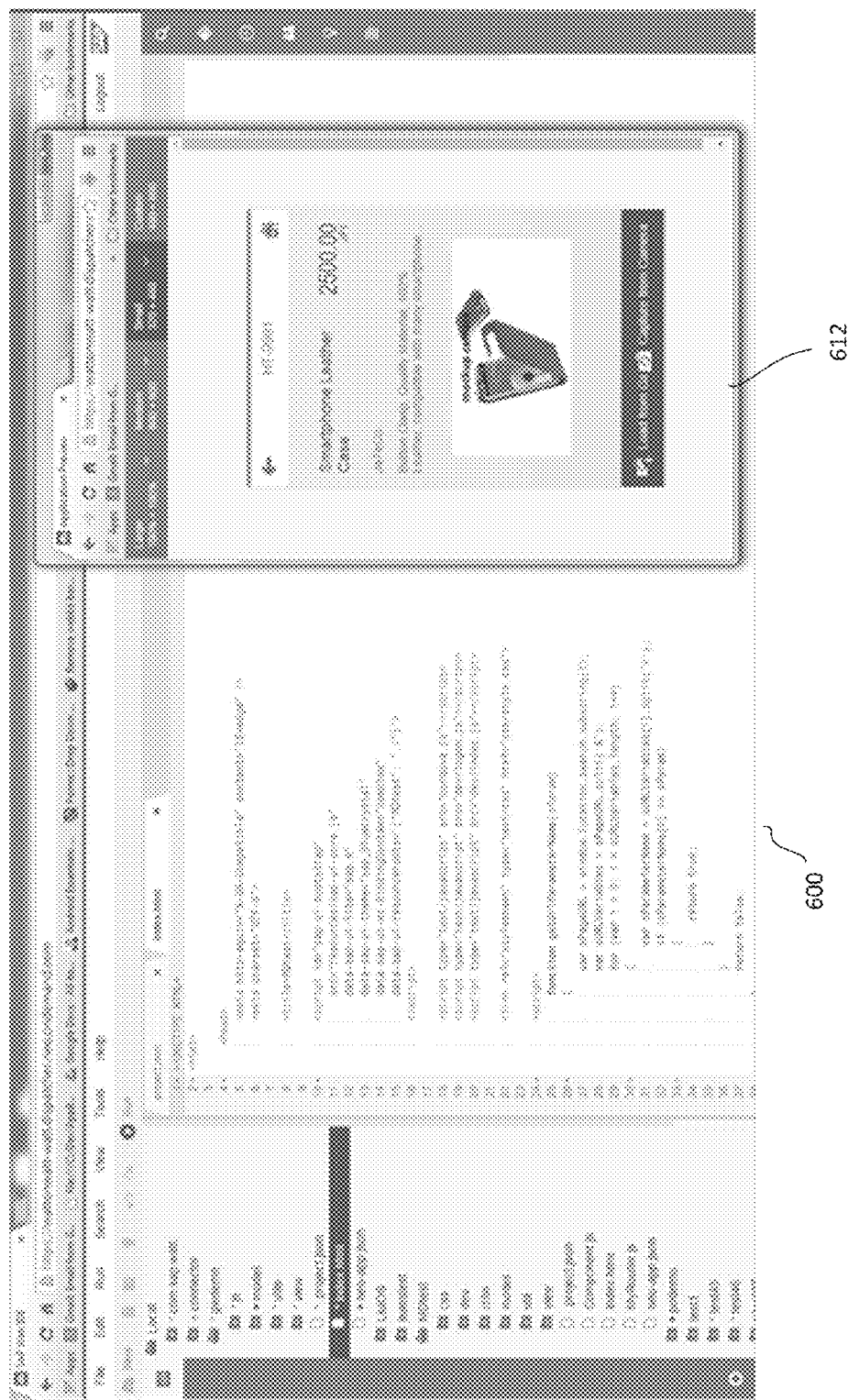

FIGS. 6a-c, illustrate demonstration of web and hybrid versions of a project. As shown, the demonstration function is selected. The demonstration function causes a pop up window 612 to display. In FIG. 6a, the web version of the project is demonstrated. Since a web App is demonstrated, the façade framework provides APIs from the web library. As such, the web APIs are merely pass-through APIs without any real function. For example, the camera function is not implemented in the web App. On the other hand, a hybrid version of the project is demonstrated in FIG. 6b. The façade framework provides APIs used from the hybrid library. Mock up data from the demonstration library is provided to simulate the real data from the API used. In this case, the mock up data includes a mock up photo of a phone case used by the camera API, as shown in FIG. 6c.

Figure 6D:
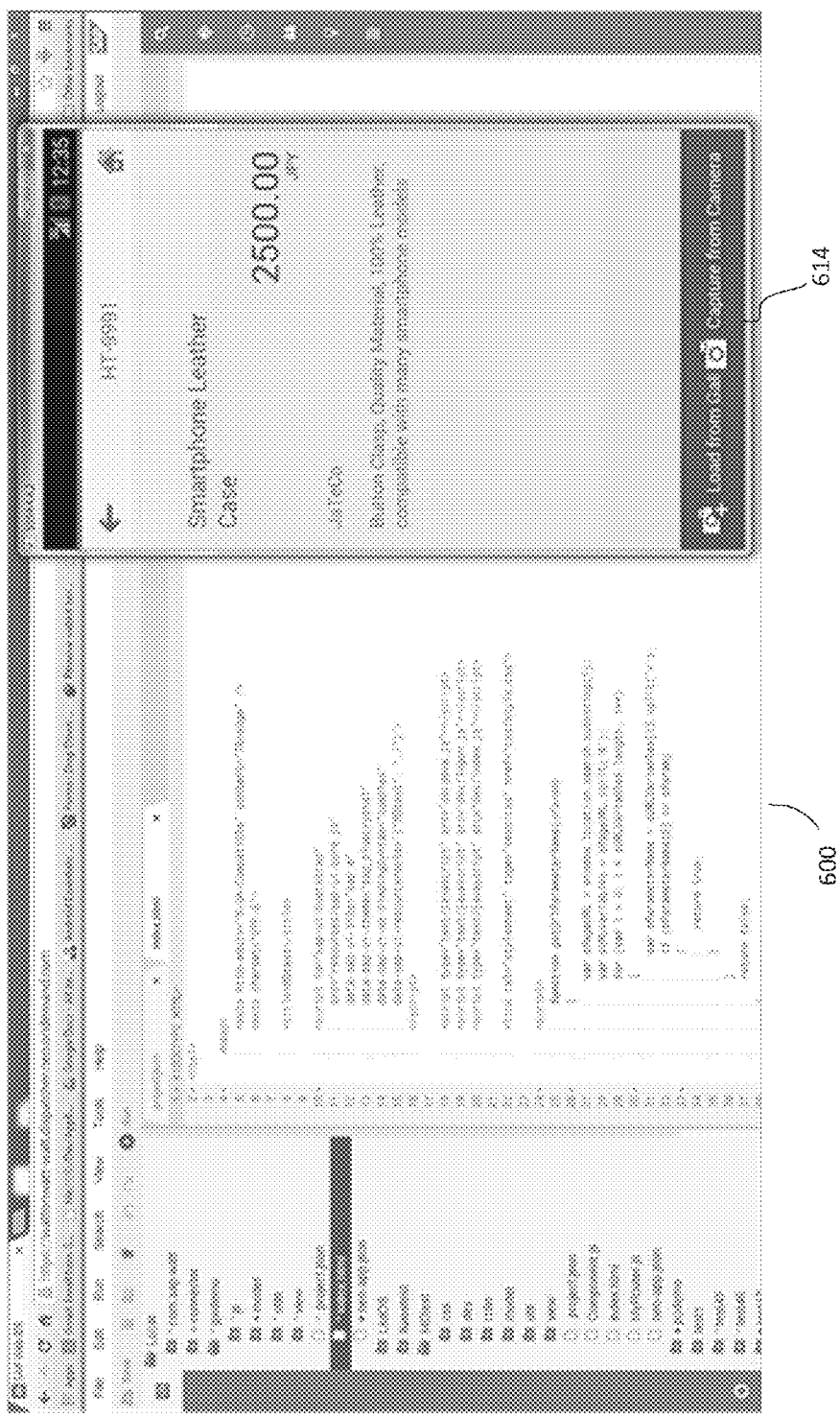
Figure 6E:
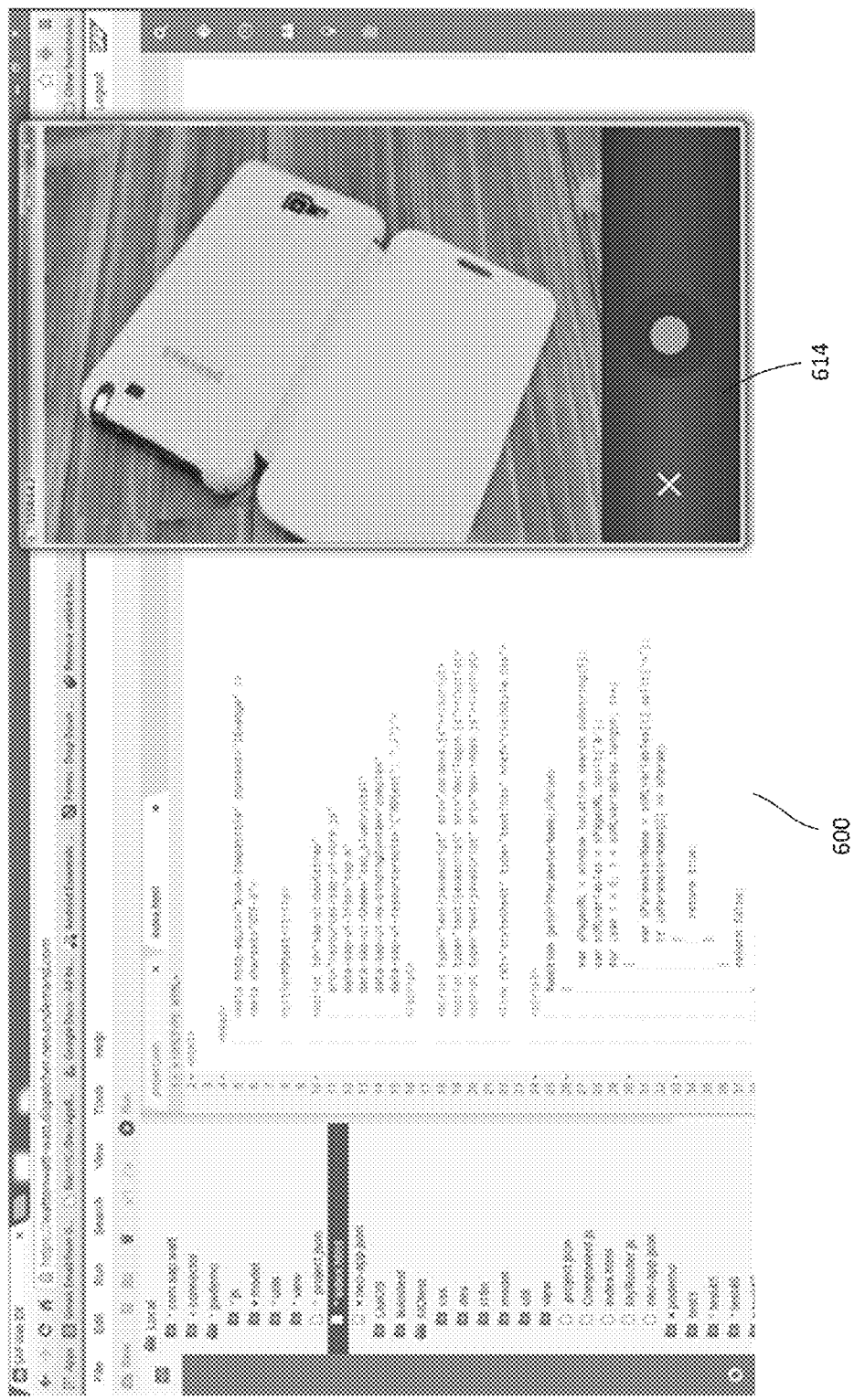
Figure 6F:
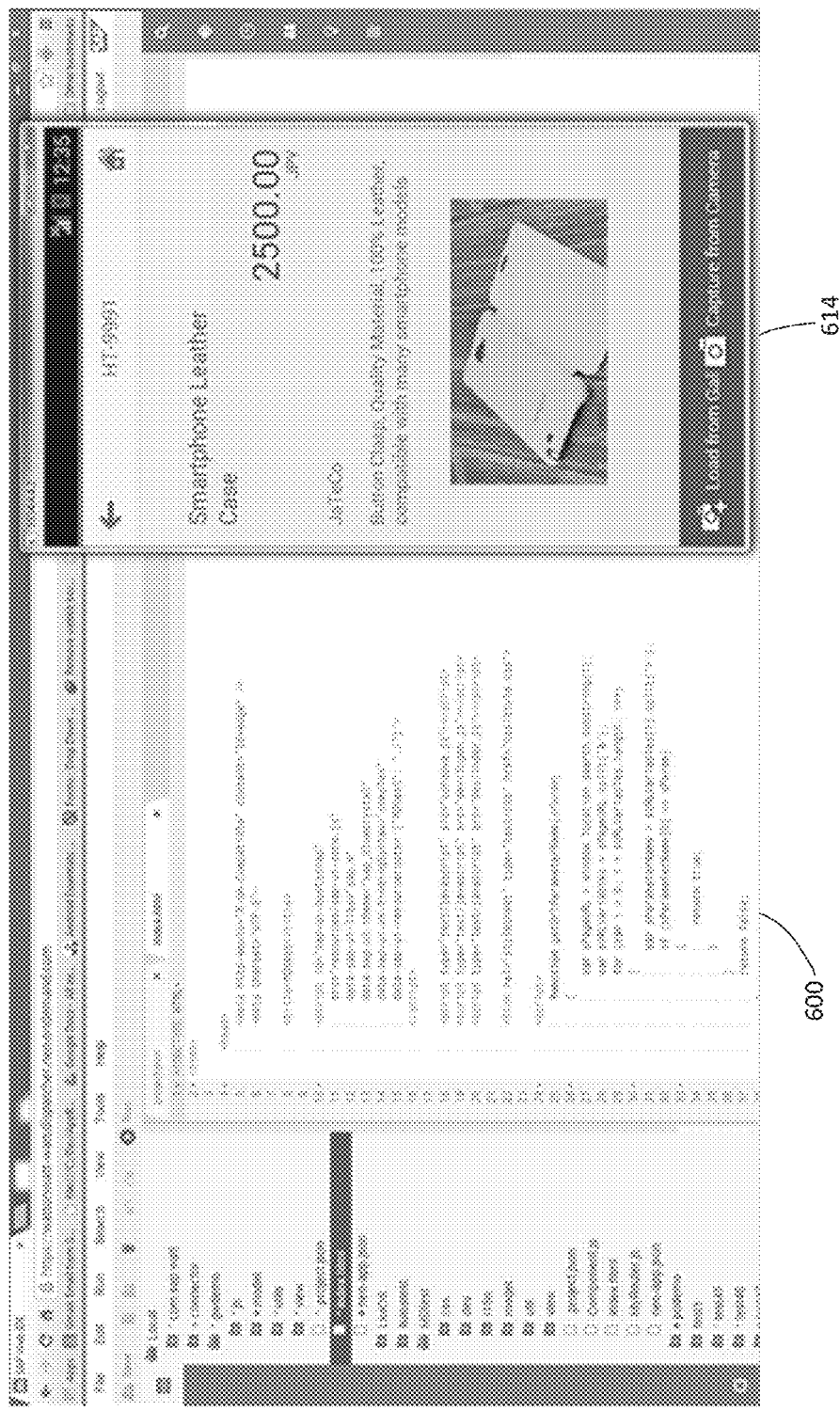

FIGS. 6d-f illustrate deployment of a hybrid version of the project to a device emulator on an end user device, such as a PC or laptop. Other types of end-user devices may also be useful. As shown in FIG. 6d, the UI includes an emulator 614 simulating the running of a packaged hybrid version of a project on a mobile device. FIG. 6e shows the camera of the mobile device taking a picture. Referring to FIG. 6f, the picture is used in the hybrid App.

As described, the façade framework may be embodied as runtime library. The façade framework may be integrated into an IDE. For example, the façade framework may be a plugin. In other implementations, the façade framework may serve as a moderator. The façade framework, for example, may be stored in a storage medium, such as one or more storage disks or in memory of a server and/or end-user devices. Other types of storage media may also be useful.

Although the one or more above-described implementations have been described in language specific to structural features and/or methodological steps, it is to be understood that other implementations may be practiced without the specific features or steps described. Rather, the specific features and steps are disclosed as preferred forms of one or more implementations.

The invention claimed is:

1. A computer-implemented method for developing web and hybrid versions of an application (App) of a project, wherein a web App resides on a server and is accessed using a browser on an end-user device and wherein a hybrid App is a mobile enabled App having access to native application program interfaces (APIs), the method comprising:

providing a façade framework, the façade framework comprising,
  a web library having a set of web APIs, the web library includes a web registration unit,
  a hybrid library having a set of hybrid APIs, the hybrid library includes a hybrid registration unit,
  wherein the web library and hybrid library comprise unified APIs in which APIs of the web library and APIs of the hybrid library have the same code, and
  a unified interface for interfacing with the web and hybrid libraries;
providing base code of a base project using an application development system, wherein the base code comprises common code to web assets common to the web and hybrid versions of the App of the project;
extending the base code to create an extended base code using the application development system to produce an extended code of the project, wherein the extended code includes hybrid features used by the project, the extended base code serves as a unified code for both the web and hybrid versions of the App of the project; and
previewing the App using the unified code, wherein a bootstrap module of the façade framework loads the App with APIs from the web library or the hybrid library according to whether the web version or hybrid version of the App is running, wherein
  when running the web version of the App, an API which is called is not implemented, the called API has no callback action according to a routing of the web registration unit, and
  when running the hybrid version of the App, an API which is called is implemented, the called API returns an action of a native feature of the called API using mock up data in the unified interface for the called APIs according to a routing of the hybrid registration unit.

2. The method of claim 1 further comprises packaging the project using a packaging module, wherein packaging comprises packaging the unified code with APIs used by the project from the web library of the façade framework to package the web version of the App.

3. The method of claim 2 further comprises deploying the web version of the App after packaging to a web server.

4. The method of claim 1 further comprises packaging the project using a packaging module, wherein packaging comprises packaging the unified code with APIs used by the project from the hybrid library of the façade framework to package the hybrid version of the App.

5. The method of claim 4 further comprises deploying the hybrid version of the App after packaging the hybrid version of the App.

6. The method of claim 1 wherein the façade framework comprises an integrated façade framework integrated with the application development system as a plug-in feature.

7. The method of claim 1 wherein the web library and hybrid library comprise corresponding APIs and wherein corresponding APIs of the web and hybrid libraries each comprises an asynchronous code skeleton having the same code that includes:
  an API call to invoke the API; and
  an API call back defining an action performed on the returned data of the API call.

8. The method of claim 1 wherein the sets of hybrid and web APIs in the hybrid library and web library facilitate a unified solution using the uniform code for both the web and hybrid versions of the App of the project.

9. The method of claim 1 wherein the mock up data comprises mock up data of the native feature of the called API.

10. The method of claim 1 wherein the bootstrap module provides a correct project configuration and loading of APIs used by the project, wherein APIs used by the project are loaded for the hybrid version of the App of the project from the hybrid library and APIs used by the project are loaded from the web library for the web version of the App.

11. The method of claim 1 comprises previewing the unified code on an end user device.

12. The method of claim 9 wherein the façade framework comprises an additional library containing the mock up data.

13. The method of claim 1 wherein the bootstrap module is embedded in an index page which is automatically loaded when running the App to automatically configure and load the libraries based on whether the hybrid or web version of the App is running.

14. The method of claim 1 wherein the façade framework comprises a demonstration library to provide mock up data for the APIs when previewing the hybrid version of the App.

15. A façade framework used in developing web and hybrid versions of an App of a project,
wherein a web App resides on a server and is accessed using a browser on an end-user device and
wherein a hybrid App is a mobile enabled App having access to native application program interfaces (APIs), the façade framework is disposed in a computing device with a processor unit and a memory unit, the façade framework comprising:
a web library in the memory unit having a web set of APIs and includes a web registration unit;
a hybrid library in the memory unit having a hybrid set of APIs and includes a hybrid registration unit, and wherein the web set of APIs in the web library and hybrid set of APIs in the hybrid library are unified APIs in which corresponding APIs of the web set and hybrid set comprise the same API codes; and
a unified interface for interfacing with the web and hybrid libraries, the façade framework facilitates developing web and hybrid versions of the App of the project using a unified code solution for both the web and hybrid versions of the App, the unified interface includes a bootstrap module, the bootstrap module when previewing the App uses the unified code by the processor, wherein
when running the web version of the App, an API which is called is not implemented, the called API has no callback action according a routing of the web registration unit, and
when running the hybrid version of the App, an API which is called is implemented, the called API returns an action of a native feature of the called API using mock up data in the unified interface for the called APIs according to a routing of the hybrid registration unit.

16. The façade framework of claim 15 wherein the bootstrap module provides a correct project configuration and loading of APIs used by the project, wherein APIs used by the project are loaded from the hybrid library for the hybrid version of the App of the project and web APIs used by the project are loaded from the web library for the web version of the App.

17. The façade framework of claim 15 wherein the web library and hybrid library comprise corresponding APIs and wherein corresponding APIs of the web and hybrid libraries each comprises an asynchronous code skeleton having the same code that includes:
an API call to invoke the API;
an API call back defining an action performed on the returned data of the API call; and
wherein the sets of APIs in the hybrid and web libraries are consistent and have the same codes to facilitate a unified solution using the uniform code for both the web and hybrid versions of the App of the project.

18. An application development system for developing web and hybrid versions of an application (App) of a project,
wherein a web App resides on a server and is accessed using a browser on an end-user device and
wherein a hybrid App is a mobile enabled App having access to native application program interfaces (APIs), the system comprising:
an integrated development environment (IDE) on a computing device having a processor unit and a memory unit for developing the web and hybrid versions of the App of the project; and
a façade framework, the façade framework comprising,
a web library in the memory unit having a web set of APIs and includes a web registration unit,
a hybrid library in the memory unit having a hybrid set of APIs and includes a hybrid registration unit, and wherein the web set of APIs in the web library and hybrid set of APIs in the hybrid library are unified APIs in which corresponding APIs of the web set and hybrid set comprise the same API codes,
a unified interface for interfacing with the web and hybrid libraries, and
wherein the façade framework facilitates developing web and hybrid versions of the App of the project using a unified code solution for both the web and hybrid versions of the App, the unified interface includes a bootstrap module, the bootstrap module when previewing the App uses the unified code by the processor, wherein
when running the web version of the App, an API which is called is not implemented, the called API has no callback action according to a routing of the web registration unit, and
when running the hybrid version of the App, an API which is called is implemented, the called API returns an action of a native feature of the called API using mock up data in the unified interface for the called APIs according to a routing of the hybrid registration unit.

19. The system of claim 18 wherein the unified interface comprises the bootstrap module providing a correct project configuration and loading of APIs used by the project, wherein the APIs used by the project is loaded for the hybrid version of the App of the project from the hybrid library and APIs used by the project are loaded from the web library for the web version of the App.

20. The system of claim 18 wherein the façade framework is integrated with the IDE as a plug-in feature.

* * * * *